United States Patent [19]
Johnson

[11] Patent Number: 4,784,546
[45] Date of Patent: Nov. 15, 1988

[54] VEHICLE FOR TRANSPORTING ROUND BALES

[76] Inventor: Bruce Johnson, R.R. #1, Box #113, Muscatine, Iowa 52761

[21] Appl. No.: 87,735

[22] Filed: Aug. 21, 1987

[51] Int. Cl.[4] ............................................. B60P 3/00
[52] U.S. Cl. ................................... 410/49; 414/24.5; 296/8
[58] Field of Search ..................... 410/47, 48, 49, 50; 414/24.5; 296/4, 6, 7, 8, 9

[56] References Cited

U.S. PATENT DOCUMENTS

| | | | |
|---|---|---|---|
| Re. 29,455 | 10/1977 | Slayton | 296/6 X |
| 4,092,050 | 5/1978 | Sobeck | 414/24.5 X |
| 4,411,572 | 10/1983 | Hostetler | 414/24.5 |
| 4,580,843 | 4/1986 | Lund | 414/24.5 X |

Primary Examiner—Robert B. Reeves
Assistant Examiner—Frank H. Williams, Jr.

[57] ABSTRACT

A vehicle having an elongated fore-and-aft main frame from opposite sides of which laterally disposed and spaced apart rigid support portions project. The support portions are horizontally coplanar and are arranged in pairs so that each pair supports a bale between them, the spacing of the portions in each pair being such that the bale is supported with its axis horizontal and above the plane of the supports. The supports terminate in free outer ends to facilitate loading and unloading of the bales. Bale stops are fixedly carried by the main frame centrally between transversely aligned pairs of support portions so as to limit inward movement of the bales when loaded and carried by the vehicle.

1 Claim, 1 Drawing Sheet

4,784,546

VEHICLE FOR TRANSPORTING ROUND BALES

BACKGROUND AND SUMMARY OF THE INVENTION

Many bale-transport vehicles are known which in one way or another provide for the loading, transport and unloading of round bales, which, in and of themselves, present many problems because of their size and weight. Some vehicles are adapted to pick up and unload bales by means of complicated mechanisms. Others lack structural integrity and suffer from abbreviated life spans. Still others are clumsy and difficult to handle on day-to-day bases.

According to the present invention, an extremely simple construction is provided, mainly comprising a main frame backbone from opposite sides of which project rigid lateral supports spaced apart in such fashion as to support bales between them, but the spacing of the supports in pairs is such that loading and unloading a bale from one pair of supports does not interfere with bales on other supports at either side of the vehicle. The bales of supports are laterally alined so as to give balance to the vehicle, and central stops are provided to prevent bales at one side of the vehicle from straying into the spaces intended for bales at the opposite side of the vehicle.

These and other objects and features of the invention will become apparent as a preferred embodiment of the invention is disclosed in the ensuing description and accompanying drawing.

DETAILED DESCRIPTION OF A PREFERRED EMBODIMENT OF THE INVENTION

Figure 1:
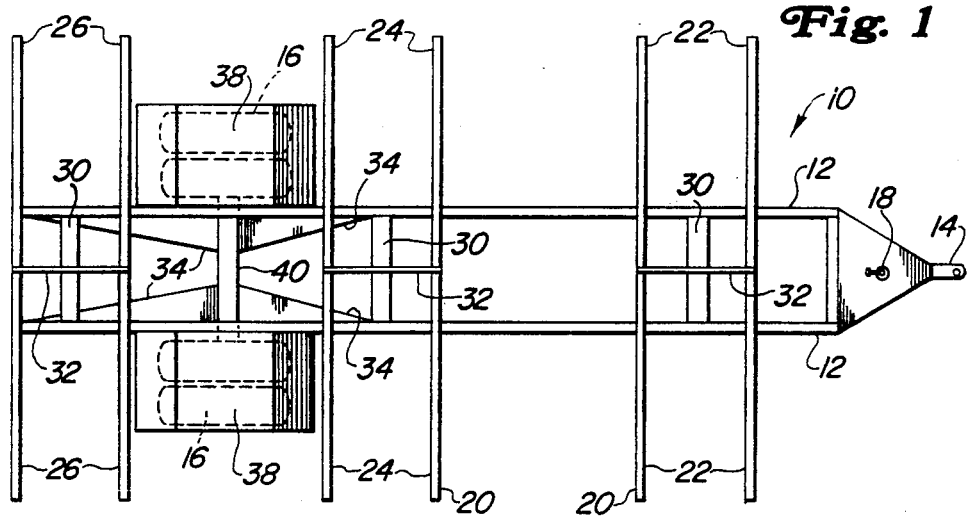
FIG. 1 is a plan view of the improved vehicle.
Figure 2:
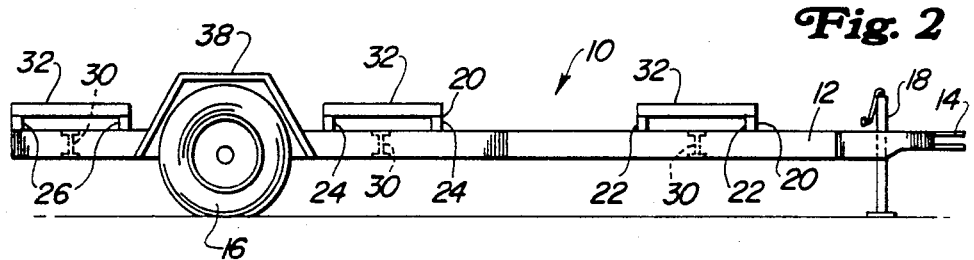
FIG. 2 is a side elevation of the same.

The trailer vehicle comprises an elongated, fore-and-aft main frame 10 made up of right and left frame members 12, which may be steel channels, I-beams or the like according to the designer's choice. The main frame has a front end equipped with a hitch member 14 for connection to any suitable towing vehicle, such as a tractor (not shown). The trailer vehicle is provided adjacent to its rear end with rear wheels, here dual pneumatic-tired wheels 16. When the trailer vehicle is disconnected from its towing vehicle, its front end may be supported on any suitable stand or jack 18, many types of which are known in the art.

The main frame has rigidly affixed thereto a plurality of horizontally coplanar cross members 20 that project symmetrically at opposite sides of the main frame so as to provide, at each side of the main frame, a plurality of paired support portions including a first pair 22 disposed at the front part of the main frame, a second pair 24 to the rear of the first or front pair and a third pair 26 to the rear of the second pair. Each of these cross members may be a continuous steel member of flat, channel, pipe, or I section of suitable strength for the task at hand. As stated, the pairs are symmetrical and thus there are like pairs 22, 24 and 26 respectively laterally alined at opposite sides of the main frame.

Figure 4:
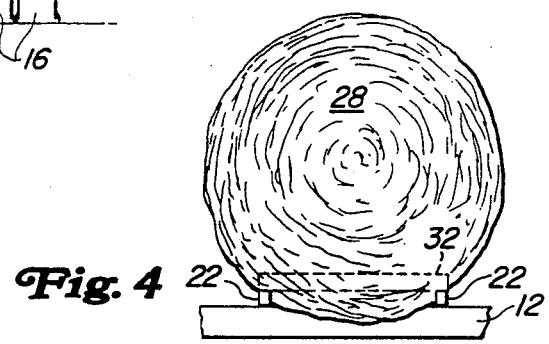
FIG. 4 is a view showing how a bale is supported between the supports of one pair.

The fore-and-aft spacing between the support portions of a pair is such that a round bale can be sustained with its axis horizontal and at a level above the plane of the supports, as best seen in FIG. 4, looking at the support pair 22 as an example in conjunction with a typical round bale 28. In the preferred example selected here for the present disclosure, the fore-and-aft spacing between paired supports is on the order of two feet and ten inches as compared to bale diameters that may run from four to six feet. In other words, the typical bale cannot slip downwardly between the paired supports, nor can it roll easily out of its carried position. However, the spacing between the rearward support of the pair 22 and the forward support of the next adjacent pair 24 is on the order of three feet and six inches. This is true as respects the spacing between the pairs 24 and 26. Thus, the pairs are spaced apart so that the carried bales do not interfere with each other. It is contemplated that bales will be carried by only the pairs 22, 24 and 26 for a total of six bales in all as one load. Of course, the frame may be extended and cross members added so as to increase the capacity of the vehicle.

Figure 3:
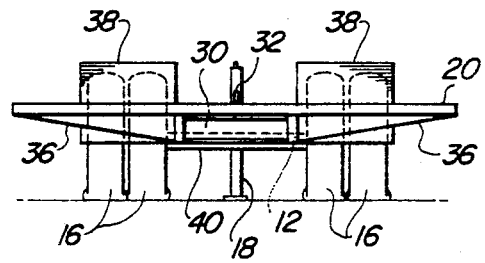
FIG. 3 is a rear elevation of the same.

The frame includes rigidly therein, as by welding, for example, a plurality of cross braces 30 which are interspaced with the supports of the pairs 22, 24 and 26 and each of these pairs is furnished with a bale stop 32 that is centrally located as between the free terminal or outer ends of the support members in the respective support pairs. The purpose of each stop is to limit inward movement of a bale at one side of the vehicle centerline into the space for a bale at the other side of the centerline. Additional bracing is provided by steel gussets 34 (FIG. 1) and 36 (FIG. 3). The wheels 16 are covered by fenders 38. The wheels are journaled on an axle housing 40 which is welded to the main frame and additionally braced by the gussets 34.

Inasmuch as the support pairs have free terminal ends, bales may be easily slid on and off endwise or lifted on and off. In a typical situation, the bales can be picked off endwise by a fork (not shown) such as provided typically as an attachment to the 3-point hitch of a tractor (also not shown).

The foregoing is not to say that the bales may not be loaded and unloaded by other means, but the free ends of the support pairs lend to the ease of loading and unloading by any means. Also, the support pairs are relatively low, in a preferred design being on the order of twenty to twenty-four inches above the ground. The total design is simple and clean-cut and the vehicle is easy to use and park. Features other than those enumerated will be apparent to those versed in the art, as will many modifications in the preferred design disclosed, all of which may be achieved without departing from the spirit and scope of the invention.

I claim:
1. A vehicle for carrying round agricultural bales comprising
(a) an elongated fore-and-aft main frame having front and rear ends, said main frame comprising left and right longitudinally elongated steel frames members and a plurality of transverse cross braces welded therebetween to connect and rigidify said frame members,
(b) a plurality of horizontally coplaner elongated cross members perpendicularly affixed to the right and left frame members, each cross member having laterally opposite support portions projecting equally at opposite sides of the main frame, each support portion having a free terminal end, said cross members being arranged in three pairs, the pairs being a foreward, rearward, and intermediate pair, and each said pair having such fore-and-aft spacing relative to a diameter of a typical round bale as to support such round bale between said support portions with its axis horizontal and transverse to the main frame, stop comprising a bar welded to upper surfaces of said cross members and being longitudinally aligned centrally between said free terminal ends, (d) an axle housing having two ends, said housing being affixed beneath said main frame, and being centrally located between said intermediate and rearward pairs of cross members, and being attached to said right and left frame members by a plurality of triangular gussets.

(e) dual wheels having pneumatic tires journaled to each of said axle housing ends, (f) a left and right fender affixed to said main frame and located above said dual wheels, and, (g) nose portion attached to and extending forwardly of said main frame, said nose portion having a triangular shape, a side of said nose portion being coextensive with the width of said main frame, said nose portion being convergent to a forward point having hitch thereon, said nose portion further comprising a jack located approximately centrally of said triangular shape.

* * * * *